US012508828B2

(12) United States Patent
Oishi et al.

(10) Patent No.: US 12,508,828 B2
(45) Date of Patent: Dec. 30, 2025

(54) PRINTING APPARATUS

(71) Applicant: Toshiba Tec Kabushiki Kaisha, Tokyo (JP)

(72) Inventors: Sadatoshi Oishi, Fuji Shizuoka (JP); Masakazu Kato, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 219 days.

(21) Appl. No.: 18/348,931

(22) Filed: Jul. 7, 2023

(65) Prior Publication Data

US 2024/0190152 A1 Jun. 13, 2024

(30) Foreign Application Priority Data

Dec. 9, 2022 (JP) ................................ 2022-197210

(51) Int. Cl.
*B41J 29/393* (2006.01)
*B41J 2/325* (2006.01)

(52) U.S. Cl.
CPC ............ *B41J 29/393* (2013.01); *B41J 2/325* (2013.01); *B41J 2029/3937* (2013.01)

(58) Field of Classification Search
CPC .. B41J 29/393; B41J 2/325; B41J 2029/3937; B41J 17/32; B41J 3/4075; B41J 35/00; B41J 33/003; B41J 33/12
See application file for complete search history.

(56) References Cited

U.S. PATENT DOCUMENTS

2003/0128269 A1* 7/2003 Squires .................... H01Q 7/00
347/214

FOREIGN PATENT DOCUMENTS

| | | | |
|---|---|---|---|
| JP | 2000355137 | A | 12/2000 |
| JP | 2001354343 | A | 12/2001 |
| JP | 2002103734 | A | 4/2002 |
| JP | 2004322403 | A | 11/2004 |
| JP | 2006232449 | A | 9/2006 |
| JP | 2007261769 | A | 10/2007 |
| JP | 2009166462 | A | 7/2009 |
| JP | 2010089360 | A | 4/2010 |
| JP | 2013174562 | A | 9/2013 |

OTHER PUBLICATIONS

Extended European Search Report dated Dec. 4, 2023, mailed in counterpart European Application No. 23193408.4, 9 pages.
Extended European Search Report dated Nov. 29, 2023, mailed in counterpart European Application No. 23193422.5, 9 pages.

* cited by examiner

*Primary Examiner* — Lisa Solomon
(74) *Attorney, Agent, or Firm* — Kim & Stewart LLP

(57) ABSTRACT

According to one embodiment, a printing apparatus includes a shaft, an antenna, and a printing section. The shaft can be inserted into a cylindrical core of an ink ribbon roll wound around the cylindrical core. The shaft permits the ink ribbon roll to rotate about the shaft. The ink ribbon roll has a wireless tag for identification purposes or the like. The antenna is provided on the shaft for data communication with the wireless tag of the ink ribbon roll. The printing section performs printing on a medium using the ink ribbon drawn out from the ink ribbon roll.

20 Claims, 5 Drawing Sheets

PRINTING APPARATUS

CROSS-REFERENCE TO RELATED APPLICATION

This application is based upon and claims the benefit of priority from Japanese Patent Application No. 2022-197210, filed Dec. 9, 2022, the entire contents of which are incorporated herein by reference.

FIELD

Embodiments described herein relate generally to a printing apparatus using an ink ribbon.

BACKGROUND

A label printer of a certain type places an ink ribbon on a long piece of label paper then conveys the ribbon along the label paper to transfer ink from the ink ribbon to the label paper using a thermal head. By this method, the label printer prints various types of information such as a bar code on the label paper, such as on each individual label on the label paper.

Typically, the label printer changes a printing speed according to a type of an ink ribbon to be used. In the related art, there is a technique of providing a wireless tag on a ribbon roll around which the ink ribbon has been wound and then performing data communication between the printer and the wireless tag. By using this technique, a printing speed can be automatically set to a speed suitable for the ink ribbon on any ribbon roll newly mounted on the printer.

The printer needs an antenna to perform data communication with the wireless tag on the ribbon roll. In order to perform reliable data communication with the wireless tag, it is typically required to dispose the antenna on the printer main body side close to the wireless tag on the ribbon roll.

The diameter of the ribbon roll becomes smaller with use of the ink ribbon. On the other hand, the diameter of the ribbon roll is its maximum size when the printing speed is automatically set (when the ribbon roll is first installed for use). Therefore, when the wireless tag is on a core (inner roll portion) of the ribbon roll, the distance between the wireless tag and the antenna can be large and communication must be accomplished through the full thickness of the ribbon roll, which makes it difficult to perform reliable data communication.

DETAILED DESCRIPTION

Figure 1:
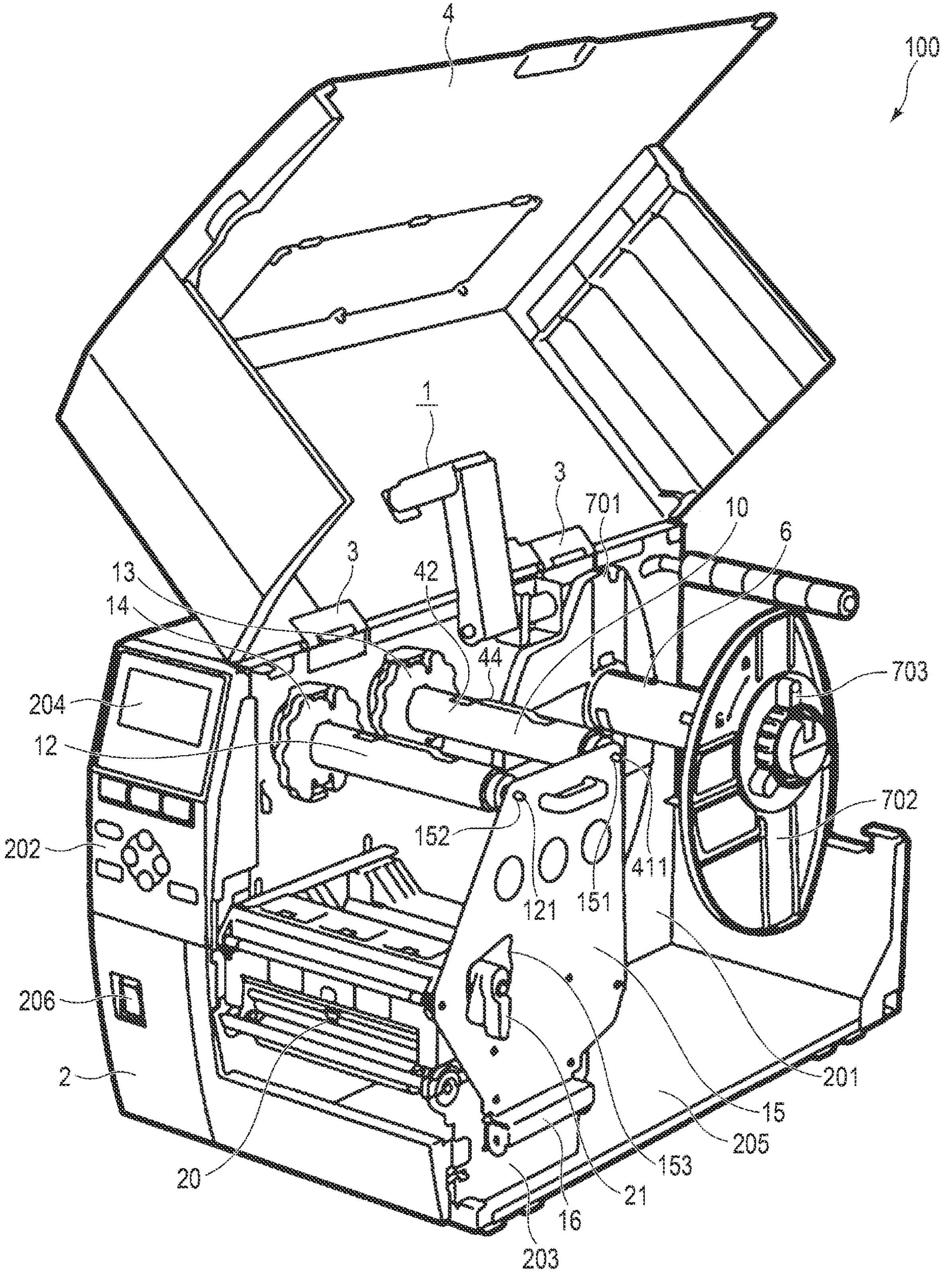
FIG. 1 is a schematic diagram showing a label printer according to an embodiment.

In general, according to one embodiment, a printing apparatus that can perform reliable data communication with a ribbon roll is described.

In general, according to one embodiment, a printing apparatus includes a shaft to be inserted into a cylindrical core of an ink ribbon roll. The shaft permits the ink ribbon roll to rotate (roll) about the shaft. An antenna is on the shaft for data communication with a wireless tag of the ink ribbon roll on the shaft. A printing section is configured to perform printing on a medium using the ink ribbon drawn out from the ink ribbon roll.

Hereinafter, certain example embodiments will be described with reference to the drawings. In each figure, the same or substantially similar components are denoted by the same reference symbols. In description of the drawings and embodiments, aspects already described may be omitted from description of subsequent drawings and embodiments. In the drawings, depicted scale may be appropriately changed drawing-to-drawing and from an actual embodiment. In the drawings, configuration may be simplified and aspects may be omitted for easier understanding of the description.

Hereinafter, a label printer 100 according to an embodiment will be described with reference to FIGS. 1 to 6. The label printer 100 is an example of a printing apparatus.

As shown in FIG. 1, the label printer 100 includes a housing 2 and a cover 4. The cover 4 is pivotably connected to the housing 2 via two hinges 3. The cover 4 is pivotable between an open position shown in FIG. 1 at which the inside of the housing 2 is exposed and a closed position at which the inside of the housing 2 is covered. A damper 1 is provided between the cover 4 and the housing 2, the damper 1 causes the opening and closing operation of the cover 4 to be slowly performed. When the cover 4 is closed, the label printer 100 has a substantially rectangular block shape.

An operation unit 202, a display unit 204, and a power switch 206 are provided on the front surface of the housing 2. The operation unit 202 permits inputs of information about label paper, the number of sheets to be printed, and the like. The display unit 204 displays operation information, an operation menu, and the like.

Figure 5:
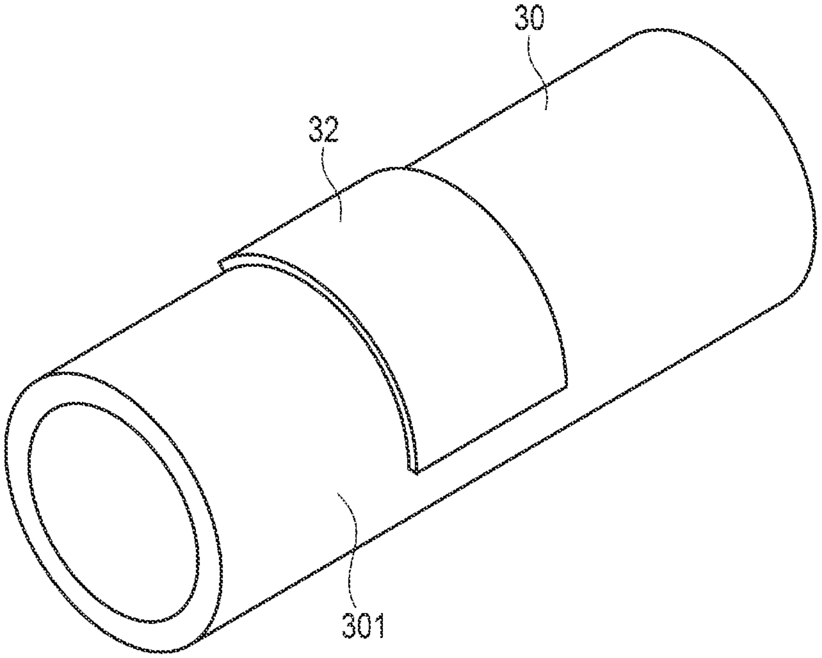
FIG. 5 is a perspective view showing a paper tube of a ribbon roll mounted on a delivery shaft.

The label printer 100 includes a supply shaft 6 on which a label paper roll can be mounted, a delivery shaft 10 having a ribbon roll detachably mounted thereon. The ribbon roll has unused ink ribbon wound around a paper tube 30 thereof (FIG. 5). The label printer 100 also has winding shaft 12 having a ribbon roll detachably mounted thereon for used ink ribbons and a printing unit 20. The printing unit 20 is an example of a printing section.

The label paper roll is formed by rolling a long strip of label paper into a roll. The label paper has a plurality of labels side by side to one another and attached to one surface of a mounting paper (backing paper). Each label has an adhesive layer on a surface facing the mounting paper. The label can be attached to and detached from the mounting paper. The labels are designed to be removed from the mounting paper to be attached to another article after being peeled off from the mounting paper. A label paper roll is obtained by winding the label paper around a core in a direction in which the surface having the label stuck thereto is facing inwards (towards the core). The label paper is an example of a medium to be printed. The medium to be printed is not limited to the label paper, and may be, for example, thermal paper.

A ribbon roll is obtained by rolling a long ink ribbon in a roll shape. The ink ribbon retains ink that is transferred to the label paper by heat. An unused ribbon roll is obtained by winding a fresh, unused ink ribbon around a paper tube 30. Such a ribbon roll has a diameter that changes (reduces) with use (unwinding) of the ink ribbon. A used ribbon roll (for the ink ribbon after use/printing) is obtained by winding the ink ribbon that has been used for printing a label and the diameter of the used ribbon roll gradually increases with used ribbon accumulation. That is, the used ribbon roll is obtained by winding the ink ribbon drawn out from the unused ribbon roll downstream of the printing unit 20. The paper tube 30 is a cylindrical body.

Ends of the supply shaft 6, the feeding shaft 10, and the winding shaft 12 on one side are fixed to a side wall 201 of the housing 2. That is, the side wall 201 holds the three shafts 6, 10, and 12 in a cantilever state. The winding shaft 12 has substantially the same structure as the feeding shaft 10 except that an antenna 40 (FIGS. 2 and 3) is not provided. Therefore, separate description of the winding shaft 12 can be omitted.

The supply shaft 6 has two holding plates 701 and 702 respectively provided near the opposite ends of the supply shaft 6 in a longitudinal direction, the two holding plates 701 and 702 respectively abutting on the opposite end surfaces of the label paper roll in an axial direction. The holding plate 701 on the back side near the side wall 201 is movable in the longitudinal direction of the supply shaft 6. The holding plate 701 determines a mounting position of the label paper roll in the axial direction so that the center of the label paper roll in the axial direction is aligned with a center of the label printer 100. The holding plate 702 on the front side mounted near an end of the supply shaft 6 is fixed to the supply shaft 6 by a fixture 703.

When the label paper roll is to be mounted on the supply shaft 6, the label paper roll is placed on the supply shaft 6 with the holding plate 702 on the front side removed from the supply shaft 6. Thereafter, the holding plate 702 on the front side is mounted on the end on the front side of the supply shaft 6. The label paper on the label paper roll is drawn out from the label paper roll by a conveyance roller 68 (refer to FIG. 6), and the same is fed out of the label printer 100 through the printing unit 20.

The delivery shaft 10 and the winding shaft 12 of the ribbon roll respectively include stopper plates 13 and 14 near the side wall 201 of the housing 2. The stopper plates 13 and 14 are movable in the longitudinal direction of the shafts 10 and 12. The stopper plate 13 abuts against one end of an unused ribbon roll in the axial direction on the delivery shaft 10 so that the center of the unused ribbon roll is aligned with the center of the label printer 100. The stopper plate 14 abuts against one end of a used ribbon roll in the axial direction on the winding shaft 12 so that the center of the used ribbon roll is aligned with the center position of the label printer 100.

A ribbon shaft fixing plate 15 is provided at a position facing end portions of the feeding shaft 10 and the winding shaft 12 on the front side away from the side wall 201. The ribbon shaft fixing plate 15 is rotatably connected to a support plate 203 erected upward from a bottom wall 205 of the housing 2 via a hinge 16. The ribbon shaft fixing plate 15 has a receiving hole 151 for receiving a tip 411 of a fixed shaft 41 of the delivery shaft 10 (hereinafter, sometimes simply referred to as the tip 411 of the delivery shaft 10), and a receiving hole 152 configured to receive a tip 121 of the winding shaft 12. The ribbon shaft fixing plate 15 includes an insertion hole 153 configured to allow a head lever 21 of the printing unit 20 to be inserted thereinto.

When the ribbon roll is to be mounted on the delivery shaft 10, the ribbon shaft fixing plate 15 can be opened, and the ribbon roll mounted on the delivery shaft 10. Thereafter, the ribbon shaft fixing plate 15 is pivoted at the position shown in the drawing, the tip 411 of the delivery shaft 10 is inserted into the receiving hole 151, and the tip 121 of the winding shaft 12 is inserted into the receiving hole 152. In this state, the ribbon shaft fixing plate 15 fixes the tip 411 of the delivery shaft 10 and the tip 121 of the winding shaft 12.

The ink ribbon drawn out from the ribbon roll mounted on the delivery shaft 10 passes through the printing unit 20 and is then wound by the winding shaft 12. The printing unit 20 conveys the ink ribbon (while superposing the ink ribbon on the label paper) and passes the stacked ink ribbon and label paper through the printing unit 20 at the same speed as the label paper.

The printing unit 20 includes a thermal head disposed on a side of the ink ribbon opposite to the label paper. The printing unit 20 includes a platen roller at a position facing the thermal head with the ink ribbon and the label paper interposed therebetween during printing. The printing unit 20 presses the ink ribbon against the label paper using the thermal head, and then thermally transfers ink of the ink ribbon to the label paper. The printing unit 20 prints a two-dimensional barcode or the like on a label of the label paper.

Figure 2:
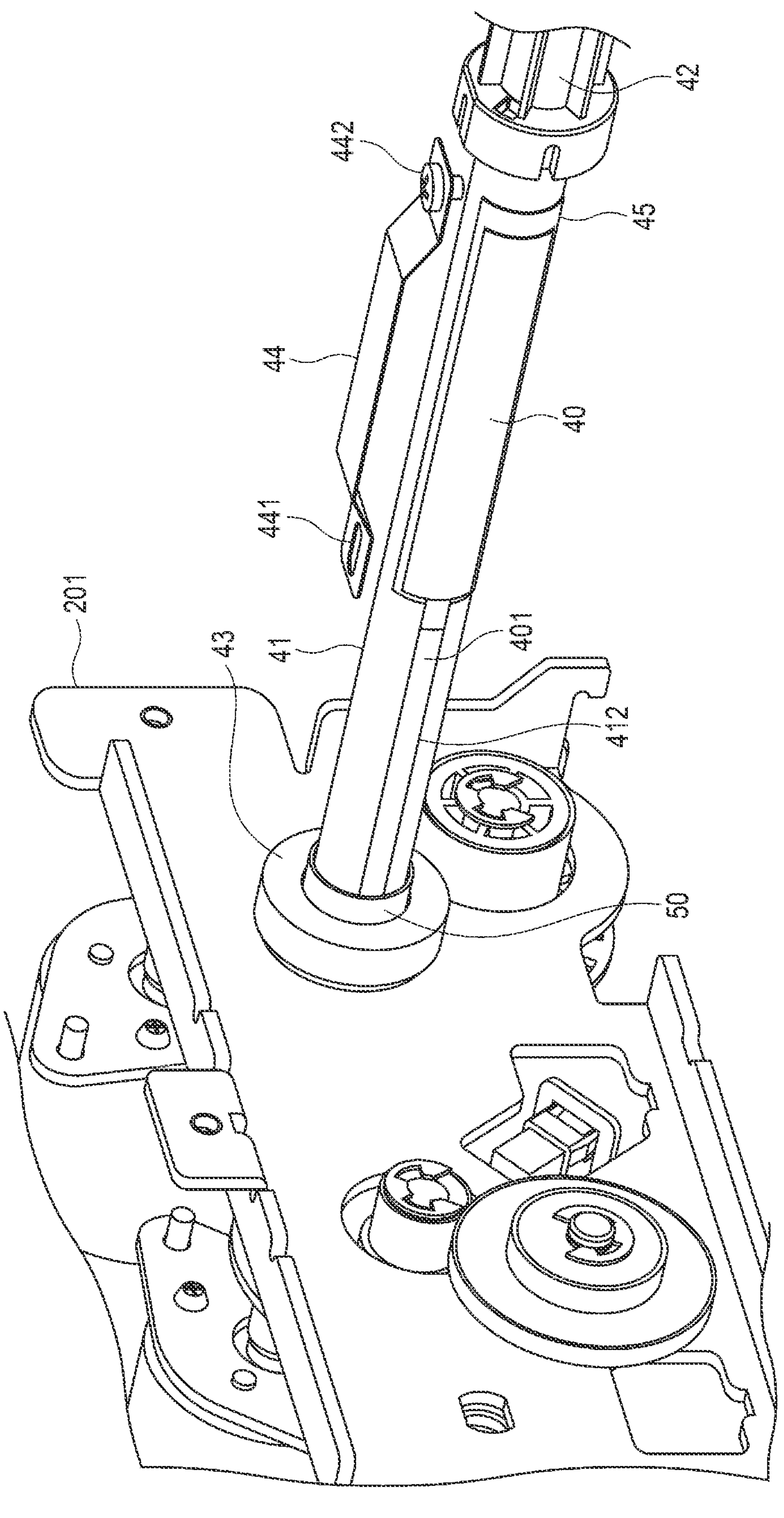
FIG. 2 is a partially enlarged perspective view of a delivery shaft of a label printer.
Figure 3:
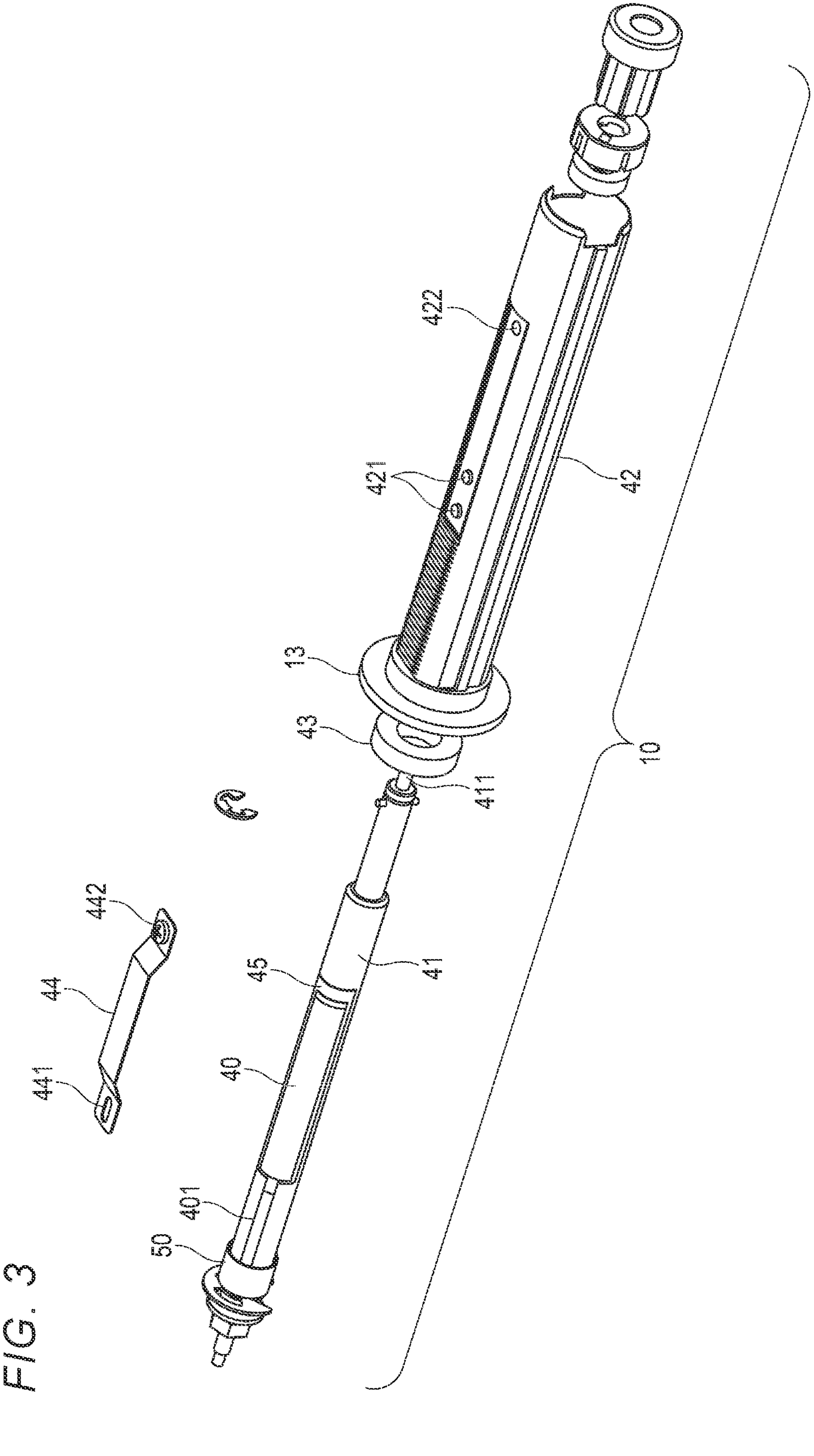
FIG. 3 is an exploded perspective view of a delivery shaft.

As shown in FIGS. 2 and 3, the delivery shaft 10 includes the fixed shaft 41 fixed to the side wall 201 of the housing 2 in a cantilever state, an intermediate sleeve 42 coaxially disposed on the outside of the fixed shaft 41, and a bearing 43 coaxially disposed on the outside of the fixed shaft 41. The fixed shaft 41 is an example of a shaft.

The fixed shaft 41 is, for example, a solid metallic rod and is fixed to the side wall 201 of the housing 2 in a cantilever state using a bolt. The tip 411 of the fixed shaft 41 protrudes from the end of the intermediate sleeve 42.

The intermediate sleeve 42 has a substantially cylindrical shape. The bearing 43 is provided therein and located near the end on the side wall 201 side. The bearing 43 is fitted to the inside of the end of the intermediate sleeve 42 and fixed to the intermediate sleeve 42. The bearing 43 has a cylindrical shape, and the same can be formed of resin or metal. The inner diameter of the intermediate sleeve 42 is substantially the same as the outer diameter of the bearing 43.

The intermediate sleeve 42 is rotatable around the fixed shaft 41 on the bearing 43. The intermediate sleeve 42 has the stopper plate 13 provided on the outside thereof and near the end on the side wall 201 side. The stopper plate 13 can be moved in the longitudinal direction of the intermediate sleeve 42 and fixed at a desired position along the longitudinal direction.

The intermediate sleeve 42 has two boss parts 421 and a screw hole 422 provided on the outer peripheral surface thereof. Here, the two boss parts 421 are provided to position a leaf spring 44, and the screw hole 422 is provided to fasten and fix the leaf spring 44 to the outer peripheral surface of the intermediate sleeve 42. The leaf spring 44 has a slit 441 provided at one end on the side wall to allow the two boss parts 421 to be inserted thereinto. A screw hole in the leaf spring 44 is provided at the other end thereof to allow a screw 442 to pass therethrough. The leaf spring 44 is fixed to the outer peripheral surface of the intermediate sleeve 42 by inserting the two boss parts 421 into the slit 441 and screwing the screw 442 into the screw hole 422.

The leaf spring 44 can be made of metal, and presses the inner surface of the paper tube 30 outwards when the paper tube 30 (ribbon roll) is mounted on the outside of the intermediate sleeve 42, thereby fixing the paper tube 30 to the intermediate sleeve 42. The leaf spring 44 protrudes from the outer peripheral surface of the intermediate sleeve 42 to such an extent that the intermediate sleeve 42 can be inserted into the paper tube 30. The leaf spring 44 has a circumferential width narrower than the width of the antenna 40 in the circumferential direction of the fixed shaft 41.

The antenna 40 can be a sheet made of metal (metallic sheet) provided on the outer peripheral surface of the fixed shaft 41. The fixed shaft 41 has a wiring 401 provided on the outer peripheral surface thereof. The wiring 401 is electrically connected to the antenna 40 and extends in the longitudinal direction of the fixed shaft 41. The antenna 40 and the wiring 401 can be formed, for example, as a continuous metal foil, and may be formed by patterning a metal foil on the surface of a flexible substrate or the like.

A magnetic sheet 45 is provided between the outer peripheral surface of the fixed shaft 41 and the antenna 40. The magnetic sheet 45 is provided to prevent a magnetic field generated by the antenna 40 from passing through the fixed shaft 41. Therefore, the magnetic sheet 45 has a size a bit larger than that of the antenna 40 so as to sufficiently block between the antenna 40 from the fixed shaft 41.

Since the antenna 40 is located away from the outer peripheral surface of the fixed shaft 41 by the thickness of the magnetic sheet 45, the end of the wiring 401 on the antenna 40 side is slightly inclined in a direction going away from the outer peripheral surface of the fixed shaft 41 toward the antenna 40. Since the bearing 43 is provided between the intermediate sleeve 42 and the fixed shaft 41, the inner diameter of the intermediate sleeve 42 can be sufficiently larger than the outer diameter of the fixed shaft 41. Therefore, if the fixed shaft 41 is inserted into the intermediate sleeve 42 or if the intermediate sleeve 42 rotates around the fixed shaft 41, the inner surface of the intermediate sleeve 42 does not slidably contact the antenna 40 and the wiring 401.

Figure 4:
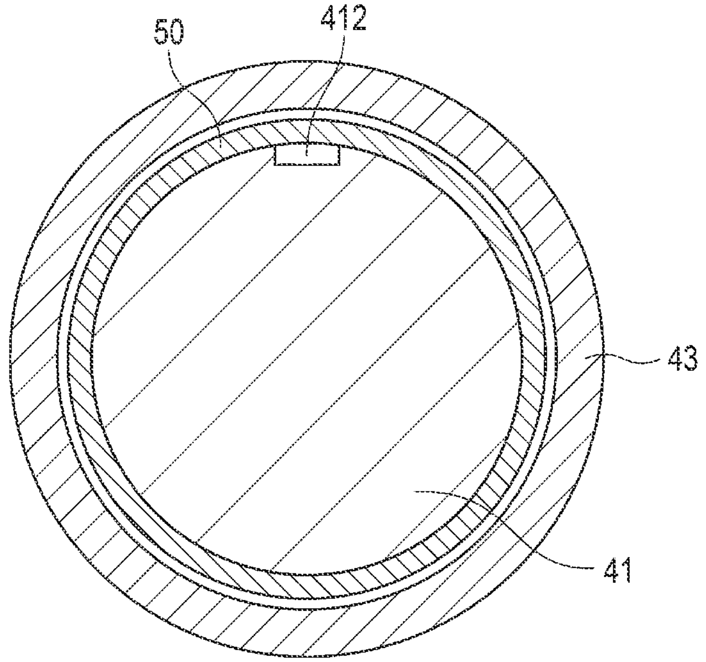
FIG. 4 is a cross-sectional view of a delivery shaft.

As shown in FIGS. 2 and 4, the fixed shaft 41 has a groove-shaped recess 412 (groove) provided on the outer peripheral surface in the longitudinal direction thereof. The width of the recess 412 in the circumferential direction of the fixed shaft 41 is slightly narrower than the width of the wiring 401. The depth of the recess 412 is slightly thinner than the thickness of the wiring 401. The antenna 40 is superposed on the magnetic sheet 45 and stuck thereto after the magnetic sheet 45 has been adhered to the outer peripheral surface of the fixed shaft 41. The wiring 401 adheres to the bottom surface of the recess 412.

A protective sleeve 50 is provided near the end of the fixed shaft 41 on the side wall 201 side. The inner diameter of the protective sleeve 50 is substantially the same as the outer diameter of the fixed shaft 41, and the outer diameter thereof is slightly smaller than the inner diameter of the bearing 43. That is, there is a gap corresponding to the thickness of the protective sleeve 50 between the intermediate sleeve 42 and the fixed shaft 41. The protective sleeve 50 is interposed between the wiring 401 and the bearing 43 and is fitted to the end of the fixed shaft 41 to be fixed thereto.

When the fixed shaft 41 having the protective sleeve 50 fixed thereto is inserted into the intermediate sleeve 42 having the bearing 43 fitted to one end thereof, and the intermediate sleeve 42 is mounted on the fixed shaft 41, the inner peripheral surface of the bearing 43 contacts the outer peripheral surface of the protective sleeve 50. Since the inner diameter of the bearing 43 is slightly larger than the outer diameter of the protective sleeve 50 and there is a slight gap therebetween, the intermediate sleeve 42 including the bearing 43 is rotatable around the fixed shaft 41 including the protective sleeve 50. The protective sleeve 50 prevents the intermediate sleeve 42 from slidably contacting the wiring 401 housed and disposed in the recess 412 of the fixed shaft 41 if the intermediate sleeve 42 rotates around the fixed shaft 41.

As shown in FIG. 5, the paper tube 30 of the ribbon roll to be mounted on the delivery shaft 10 includes an IC tag 32 configured to perform wireless communication. The IC tag 32 has a rectangular sheet shape and adheres to the outer peripheral surface 301 of the paper tube 30 to at the center position (or substantially so) of the paper tube 30 along the axial direction. The ink ribbon is superposed on the outside of the IC tag 32 and wound around the outer peripheral surface of the paper tube 30. In some examples, the IC tag 32 may be provided on an outer surface of the paper tube 30, or an inner surface of the paper tube 30. In other examples, the IC tag may be inside the paper tube 30. The IC tag is an example of a wireless tag.

Figure 6:
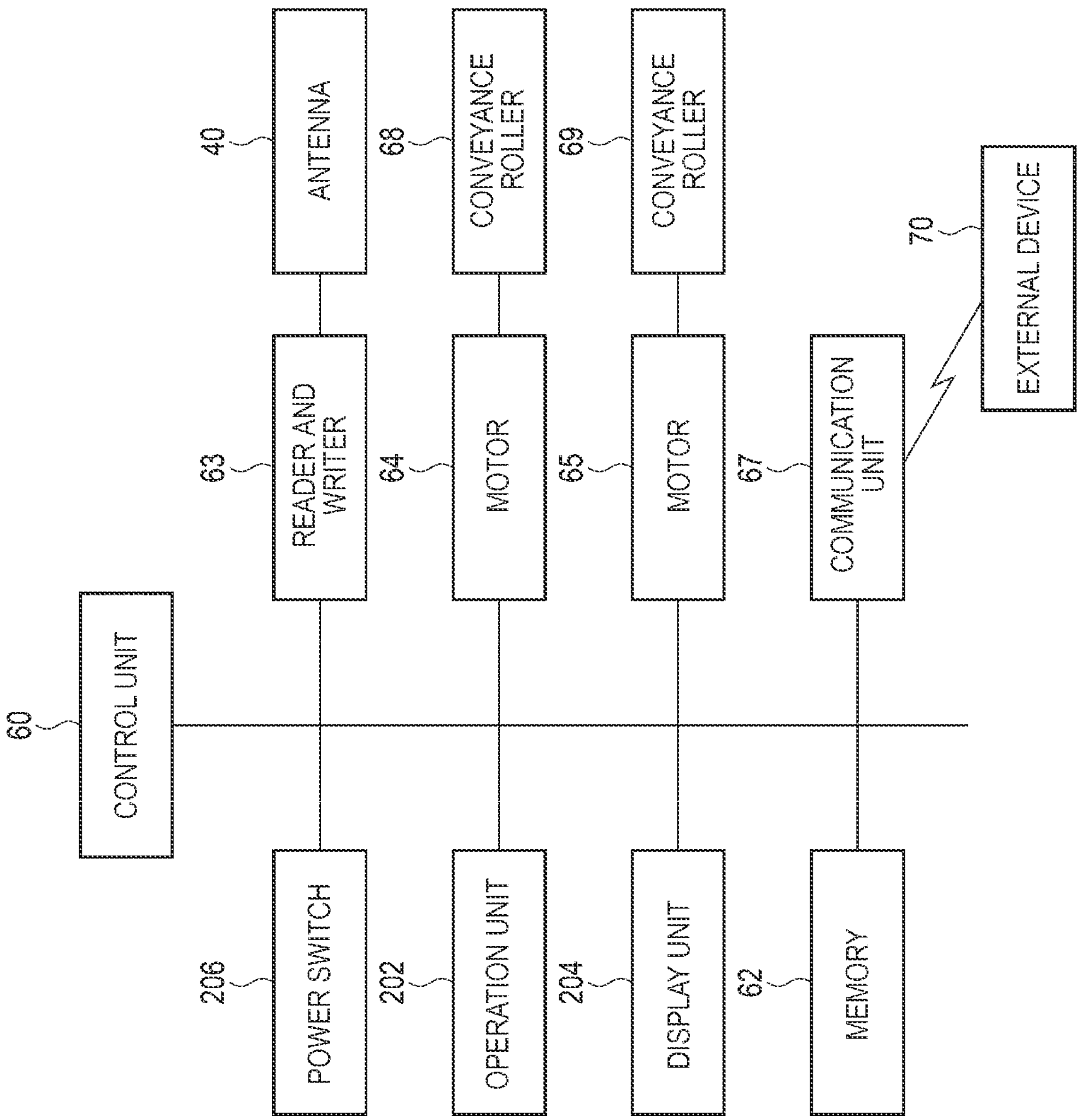
FIG. 6 is a block diagram of a control system of a label printer.

As shown in FIG. 6, the label printer 100 includes a control unit 60 configured to set the printing speed depending on the type of ink ribbon being used. The control unit 60 connects to the power switch 206, the operation unit 202, the display unit 204, a memory 62, a reader/writer 63, motors 64 and 65, and a communication unit 67.

The memory 62 stores a control program and data related to the printing speed suitable for the ink ribbons. The reader/writer 63 wirelessly communicates with the IC tag 32 via the antenna 40 to write data to the IC tag 32 and read data from the IC tag 32. The motor 64 rotates the conveyance roller 68 configured to draw out the label paper from the label paper roll. The motor 65 rotates a conveyance roller 69 configured to convey the ink ribbon for printing operations. The communication unit 67 transmits and receives various types of data to and from an external device 70 such as a host computer.

After the ribbon roll on the delivery shaft 10 is replaced, the control unit 60 controls the reader/writer 63 to read data from the IC tag 32 via the antenna 40 when the cover 4 of the housing 2 is closed and the power switch 206 is turned ON. The IC tag 32 stores data about the ink ribbon wound around the paper tube 30. The data about the ink ribbon includes, for example, a product name, a type (e.g., a ribbon for plain paper or a ribbon for thick paper), a width, a length, a date of manufacture, a serial number (manufacturing number), a remaining amount of ink ribbon, and the like.

Thereafter, the control unit 60 reads, from the memory 62, the printing speed suitable for the type of ink ribbon identified by reading the IC tag 32, and controls the motors 64 and 65 so as to reach this printing speed. The control unit 60 controls the motors 64 and 65 so as to perform printing at this printing speed until the ink ribbon is used up.

The control unit 60 rewrites the remaining amount of the ink ribbon recorded in the memory 62 when a printing task ends. The control unit 60 can display the remaining amount of the ink ribbon via the display unit 204.

In the present embodiment, since the antenna 40 is provided on the delivery shaft 10 having the ribbon roll mounted thereon and configured to have the ink ribbon wound around the paper tube 30, the antenna 40 can be disposed close to the IC tag 32 of the paper tube 30, and reliable data communication can be performed with the IC tag 32.

In addition, a magnetic sheet 45 larger than the antenna 40 is provided between the antenna 40 and the outer peripheral surface of the fixed shaft 41, thereby making it possible not only to prevent the magnetic field from the antenna 40 from weakening by transmission through the fixed shaft 41 made of metal, but also to perform more reliable data communication with the IC tag 32.

Since the width of the leaf spring 44 configured to fix the paper tube 30 to the outer periphery of the intermediate sleeve 42 is narrower than the width of the antenna 40, reliable data communication can be performed between the antenna 40 and the IC tag 32 even in a case where the leaf spring 44 is disposed between the antenna 40 and the IC tag 32.

Alternatively, if the ribbon roll is mounted on the intermediate sleeve 42, a mark for alignment may be added to the ends of the intermediate sleeve 42 and the paper tube 30 so that relative rotation positions of the two are arranged in a positional relationship in which the IC tag 32 and the leaf spring 44 do not overlap each other. Additionally, if the intermediate sleeve 42 having the ribbon roll mounted thereon is mounted on the fixed shaft 41, a mark for alignment may be added to the intermediate sleeve 42 and the fixed shaft 41 so that relative rotation positions of the two are arranged in a positional relationship in which the antenna 40 and the IC tag 32 do not overlap each other.

While certain embodiments have been descried, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing apparatus, comprising:

a shaft to be inserted into a cylindrical core of an ink ribbon roll, the shaft permitting the ink ribbon roll to roll about the shaft;

an antenna on the shaft for data communication with a wireless tag of the ink ribbon roll on the shaft;

a printing section configured to perform printing on a medium using the ink ribbon drawn out from the ink ribbon roll; and a sleeve configured to be inserted into the cylindrical core, wherein the sleeve is configured to rotate around the shaft without contacting the antenna on an outer peripheral surface of the shaft.

2. The printing apparatus according to claim 1, wherein the antenna is on an outer peripheral surface of the shaft to face an inner surface of the cylindrical core of the ink ribbon roll on the shaft.

3. The printing apparatus according to claim 2, wherein the shaft is metal.

4. The printing apparatus according to claim 3, further comprising:

a magnetic sheet between the outer peripheral surface of the shaft and the antenna.

5. The printing apparatus according to claim 1, further comprising:

a magnetic sheet between an outer peripheral surface of the shaft and the antenna.

6. The printing apparatus according to claim 1, wherein the shaft is a solid metal rod.

7. The printing apparatus according to claim 1, further comprising:

a leaf spring on an outer peripheral surface of the sleeve, wherein the leaf spring is configured to press against an inner surface of the cylindrical core, and a width of the leaf spring in a circumferential direction of the sleeve is less than a width of the antenna in the circumferential direction.

8. The printing apparatus according to claim 7, wherein the leaf spring is metallic.

9. The printing apparatus according to claim 7, wherein the leaf spring is fastened to the sleeve with a screw.

10. The printing apparatus according to claim 9, wherein the leaf spring includes a slot on an end opposite to the screw, the sleeve includes a pair of boss parts, and the pair of boss parts are configured to insert into the slot.

11. The printing apparatus according to claim 10, wherein the leaf spring is metallic.

12. The printing apparatus according to claim 1, wherein the print section includes a thermal printhead.

13. The printing apparatus according to claim 1, wherein the antenna comprises a metal foil.

14. The printing apparatus according to claim 1, wherein the shaft includes a groove on an outer peripheral surface, and a wiring connected to the antenna is in the groove.

15. A printing apparatus, comprising:

a shaft to be inserted into a cylindrical core of a ink ribbon roll, the shaft permitting the ink ribbon roll to roll about the shaft;

a tag reader configured to read a wireless tag of the ink ribbon roll on the shaft;

an antenna on the shaft connected to the tag reader for data communication with the wireless tag of the ink ribbon roll on the shaft;

a thermal printhead configured to perform printing on a medium using the ink ribbon drawn out from the ink ribbon roll; and a sleeve configured to be inserted into the cylindrical core, wherein the sleeve is configured to rotate around the shaft without contacting the antenna on an outer peripheral surface of the shaft.

16. The printing apparatus according to claim 15, wherein the antenna is on an outer peripheral surface of the shaft to face an inner surface of the cylindrical core of the ink ribbon roll on the shaft.

17. The printing apparatus according to claim 16, wherein the shaft is metal.

18. The printing apparatus according to claim 17, further comprising:

a magnetic sheet between the outer peripheral surface of the shaft and the antenna.

19. The printing apparatus according to claim 15, further comprising:

a magnetic sheet between an outer peripheral surface of the shaft and the antenna.

20. The printing apparatus according to claim 15, further comprising:

a leaf spring on an outer peripheral surface of the sleeve, wherein the leaf spring is configured to press against an inner surface of the cylindrical core, and a width of the leaf spring in a circumferential direction of the sleeve is less than a width of the antenna in the circumferential direction.

* * * * *